United States Patent
Brendel et al.

(10) Patent No.: US 8,061,755 B2
(45) Date of Patent: Nov. 22, 2011

(54) VEHICLE WITH DRIVER'S SEAT WITH ADJUSTABLE INCLINATION

(75) Inventors: Thomas Brendel, Sinsheim (DE); Andreas Biederstaedt, Klausdorf (DE)

(73) Assignee: Otto Bock Healthcare GmbH, Duderstadt (DE)

( * ) Notice: Subject to any disclaimer, the term of this patent is extended or adjusted under 35 U.S.C. 154(b) by 1149 days.

(21) Appl. No.: 11/227,208

(22) Filed: Sep. 16, 2005

(65) Prior Publication Data

US 2006/0061179 A1    Mar. 23, 2006

(30) Foreign Application Priority Data

Sep. 18, 2004    (DE) .......................... 10 2004 045 388

(51) Int. Cl.
*B60N 2/39* (2006.01)
(52) U.S. Cl. ..................................... 296/65.15; 297/325
(58) Field of Classification Search ............... 296/65.01, 296/65.13, 65.14, 65.15, 65.18; 297/216.16, 297/216.19, 300.1, 300.2, 302.1, 313, 316, 297/317, 318, 322, 325, 329, 344.1, 344.11, 297/344.12, DIG. 4
See application file for complete search history.

(56) References Cited

U.S. PATENT DOCUMENTS

| | | | | |
|---|---|---|---|---|
| 968,195 A | * | 8/1910 | Reed | 114/194 |
| 2,100,170 A | * | 11/1937 | Parks | 297/326 |
| 2,313,023 A | * | 3/1943 | Ruegger | 297/329 |
| 3,232,575 A | * | 2/1966 | Ferro | 248/430 |
| 3,999,799 A | * | 12/1976 | Daswick | 297/270.3 |
| 4,101,168 A | * | 7/1978 | Ferro | 297/329 |
| 4,401,342 A | * | 8/1983 | Andersson | 297/216.16 |
| 4,759,561 A | * | 7/1988 | Janssen | 280/250.1 |
| 4,781,414 A | * | 11/1988 | Periou | 297/313 |
| 4,842,232 A | * | 6/1989 | Pipon et al. | 248/395 |
| 4,941,709 A | * | 7/1990 | Moller | 297/325 |
| 5,244,252 A | * | 9/1993 | Serber | 297/216.19 |
| 5,249,838 A | * | 10/1993 | Kulpa et al. | 297/328 |
| 5,261,723 A | * | 11/1993 | Hosoe | 297/344.14 |
| 5,494,331 A | * | 2/1996 | Onishi et al. | 297/256.13 |
| 5,624,159 A | * | 4/1997 | Celoni et al. | 297/325 |
| 5,669,324 A | * | 9/1997 | Muir, III | 114/194 |

(Continued)

FOREIGN PATENT DOCUMENTS

DE    3110111 A1 *    9/1982 .................... 297/316

(Continued)

OTHER PUBLICATIONS

English Language Abstract of DE 198 24 493.

*Primary Examiner* — Glenn Dayoan
*Assistant Examiner* — Paul Chenevert
(74) *Attorney, Agent, or Firm* — Andrew M. Calderon; Roberts Mlotkowski Safran & Cole, P.C.

(57) ABSTRACT

A vehicle, in particular electric wheelchair, having a chassis and a driver's seat which is fastened thereto and can be set in its inclination with respect to the chassis. The vehicle includes an inclination sensor which determines the angular position ($\alpha$) of the seat surface of the driver's seat with respect to the horizontal (H), an adjusting device which is connected to the chassis and to the driver's seat, and a control and regulating device which is operatively connected to the inclination sensor and the adjusting device and via which the driver's seat can be pivoted by the adjusting device in such a manner that its seat surface is always situated essentially parallel to the horizontal (H).

19 Claims, 5 Drawing Sheets

U.S. PATENT DOCUMENTS

| | | | | |
|---|---|---|---|---|
| 5,725,274 A | * | 3/1998 | Bergmeister | 297/201 |
| 5,967,609 A | * | 10/1999 | Potter | 297/325 |
| 6,056,363 A | * | 5/2000 | Maddox | 297/325 |
| 6,068,280 A | | 5/2000 | Torres | 280/304.1 |
| 6,105,706 A | * | 8/2000 | Cooper | 180/282 |
| 6,106,065 A | * | 8/2000 | Carroll | 297/330 |
| 6,206,393 B1 | | 3/2001 | Mascari et al. | |
| 6,273,389 B1 | * | 8/2001 | Carlgren | 248/371 |
| 6,450,578 B1 | * | 9/2002 | Taggett | 297/325 |
| 7,007,965 B2 | * | 3/2006 | Bernatsky et al. | 280/304.1 |
| 7,090,240 B2 | * | 8/2006 | Papac | 280/647 |

FOREIGN PATENT DOCUMENTS

| | | | | |
|---|---|---|---|---|
| DE | 3805630 C1 | * | 7/1989 | 280/250.1 |
| DE | 4201412 A1 | * | 7/1993 | 180/282 |
| DE | 198 21 451 A1 | | 11/1998 | |
| DE | 198 24 493 | | 12/1998 | |
| EP | 0829247 A2 | | 3/1998 | |
| GB | 2029334 A | * | 3/1980 | 297/327 |
| GB | 2216405 A | * | 10/1989 | 248/429 |
| JP | 60067235 A | * | 4/1985 | 297/317 |
| JP | 60191837 A | * | 9/1985 | 296/65.09 |
| WO | WO 9315631 A1 | * | 8/1993 | 297/318 |

* cited by examiner

VEHICLE WITH DRIVER'S SEAT WITH ADJUSTABLE INCLINATION

CROSS REFERENCE TO APPLICATIONS

The present application claims priority under 35 U.S.C. §119 of German Patent Application German Patent Application No. 10 2004 045 388.8 filed on Sep. 18, 2004, which is expressly incorporated by reference in its entirety herein.

FIELD OF INVENTION

The invention relates to a vehicle, in particular, an electric wheelchair, having a chassis and a driver's seat which can be set thereon in its inclination with respect to the chassis along two curved rails, an inclination sensor which determines the angular position of the seat surface of the driver's seat with respect to the horizontal, an adjusting device which is connected to the chassis and the driver's seat, and a control and regulating device which is operatively connected to the inclination sensor and the adjusting device and via which the driver's seat can be pivoted by means of an adjusting device in such a manner that its seat surface is always situated essentially parallel to the horizontal.

BACKGROUND OF INVENTION

A vehicle is disclosed, for example, in DE 198 21 451 A1. The rails are connected fixedly to the chassis. The driver's seat is mounted over a region of movement on the rails, for example via wheels, which can be driven by electric motor. By means of this configuration of the seat mounting and of the adjustment region, the center of gravity of the loaded vehicle is situated relatively high up, which may result in critical handling on a flat, uneven underlying surface.

Physically disabled people very frequently use electric wheelchairs to travel along paths and roads. For outside, there are specially designed vehicles which have a more powerful drive and more stable running gear dimensions than vehicles designed primarily for inside, so that the vehicles can be used also to cope with relatively uphill and downhill sections. When traveling downhill, there is the problem that the person using the wheelchair has a tendency, as a consequence of the changed angle with respect to the axis of gravitational force, to slide on the seat surface of the driver's seat. As a consequence of their disablement, the drivers of electric wheelchairs frequently have reduced muscle function and therefore cannot physically counteract the changed center-of-gravity conditions. Therefore, the person either has to be fixed on the seat via a belt system, which is then associated with a high pressure loading of the fabric situated under the belt or a seat angle adjustment means has to be provided by means of which the inclination of the driver's seat with respect to the chassis can be set. Before traveling downhill, the seat then has to be inclined manually out of the normal position and, after the downhill section is finished, has to be brought back again into the normal position. The drivers frequently require external assistance for this. In addition, the actuation of the manual seat adjustment has to take place at a standstill, which means that the adjustment process is correspondingly costly.

EP 0 829 247 A2 describes a wheelchair which comprises a chassis and a seat mounted on the chassis, in which the inclination of the seat surface can reach any desired position by means of adjusting elements. An inclination measuring device controls the adjusting elements, so that the inclination of the seat surface can be kept horizontal even if the wheelchair is passing over uneven terrain.

SUMMARY OF INVENTION

Starting from this problem definition, the mounting of the driver's seat of a vehicle is to be improved in such a manner that it not only affords a high degree of comfort for the driver when traveling downhill and, in particular, can also be used by people who are limited in their physical freedom of movement, but also permits a low center of gravity, so that stable handling is ensured even on a flat and uneven underlying surface.

To solve the problem, a vehicle of the generic type is distinguished by the fact that the two guide rails are fastened to the driver's seat and are mounted in each case at least two rollers connected in a positionally fixed manner to the chassis.

By means of this configuration, the driver's seat is pivoted in a manner such that it is correspondingly opposed to the slope of the road, so that the driver always sits essentially parallel to his axis of gravitational force even when traveling downhill and can also safely guide the vehicle without being fixed in place by a belt. By means of the rollers, a mounting which is low in friction, and an angular adjustment are possible, so that the adjusting device can be of correspondingly small dimensions.

Since the rollers are at a different vertical distance from a reference plane on the chassis, the guide rails which are formed allow the driver's seat to be guided in a curved manner permitting a structurally simple and uniform pivoting movement.

If four rollers are provided in each case, these can be arranged in pairs opposite one another and can guide the rail from above and below, so that the guide rails are prevented from slipping out even during a journey through uneven terrain or over potholes.

The guide rails are preferably of round design in cross section.

The adjusting device used can be a telescopic cylinder which can be driven via a linear electric motor.

In order to adapt the driving seat to the inclination of the carriageway, the seat is pivoted about a virtual pivotal point when the vehicle is traveling downhill. This virtual pivotal point is preferably situated in the vicinity of the pivotal point of the mass of a driver sitting on the driver's seat. The pivoting movement is regulated by the control and regulating device in such a manner that the seat surface of the driver's seat is always situated essentially parallel to the horizontal H during travel downhill.

BRIEF DESCRIPTION OF DRAWINGS

An exemplary embodiment of the invention will be described in more detail below with the aid of a drawing, in which.

DESCRIPTION OF EMBODIMENTS OF THE INVENTION

Figure 1:
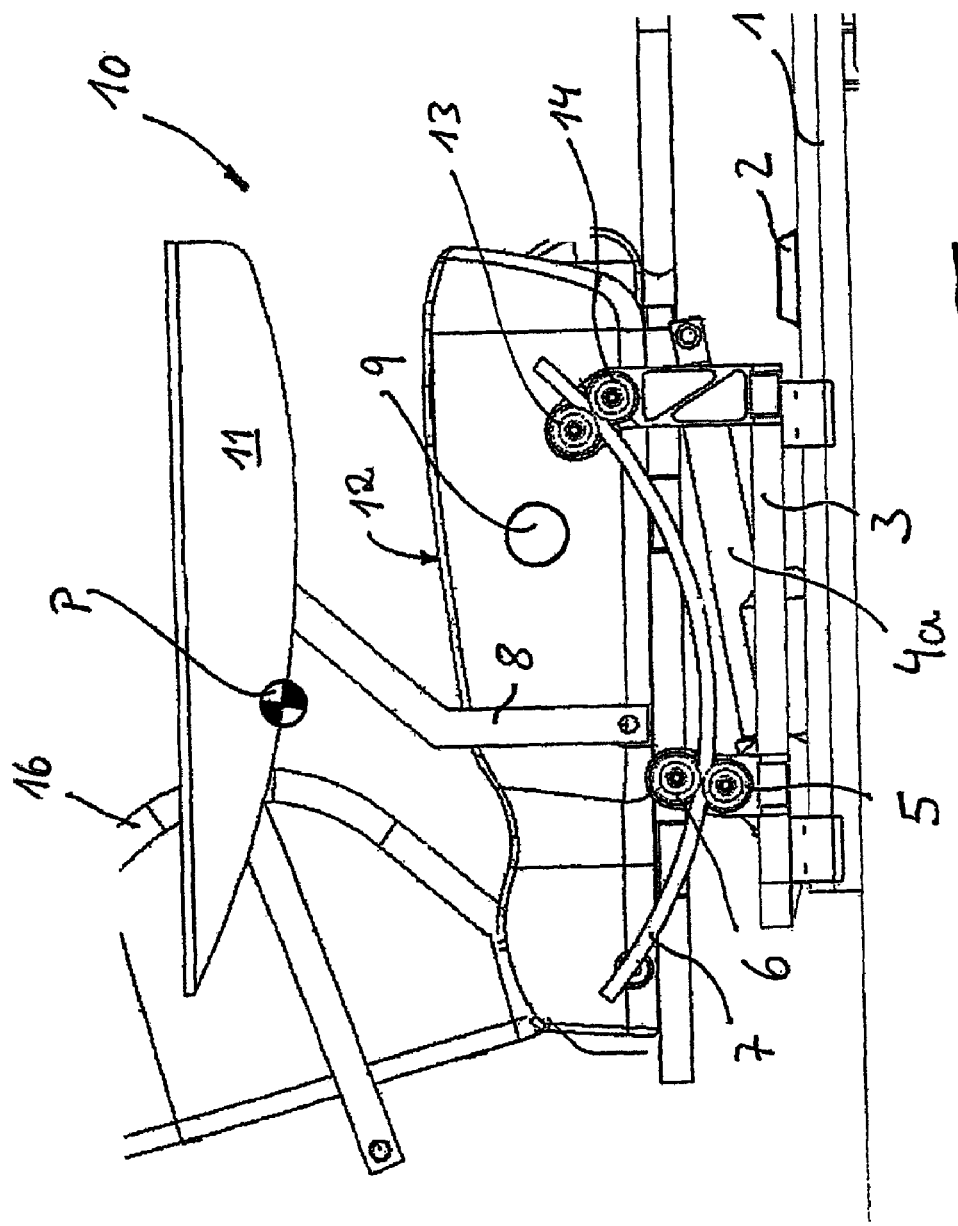
FIG. 1 shows the partial side view of a driver's seat, which is fastened on the chassis, in a normal position.
Figure 2:
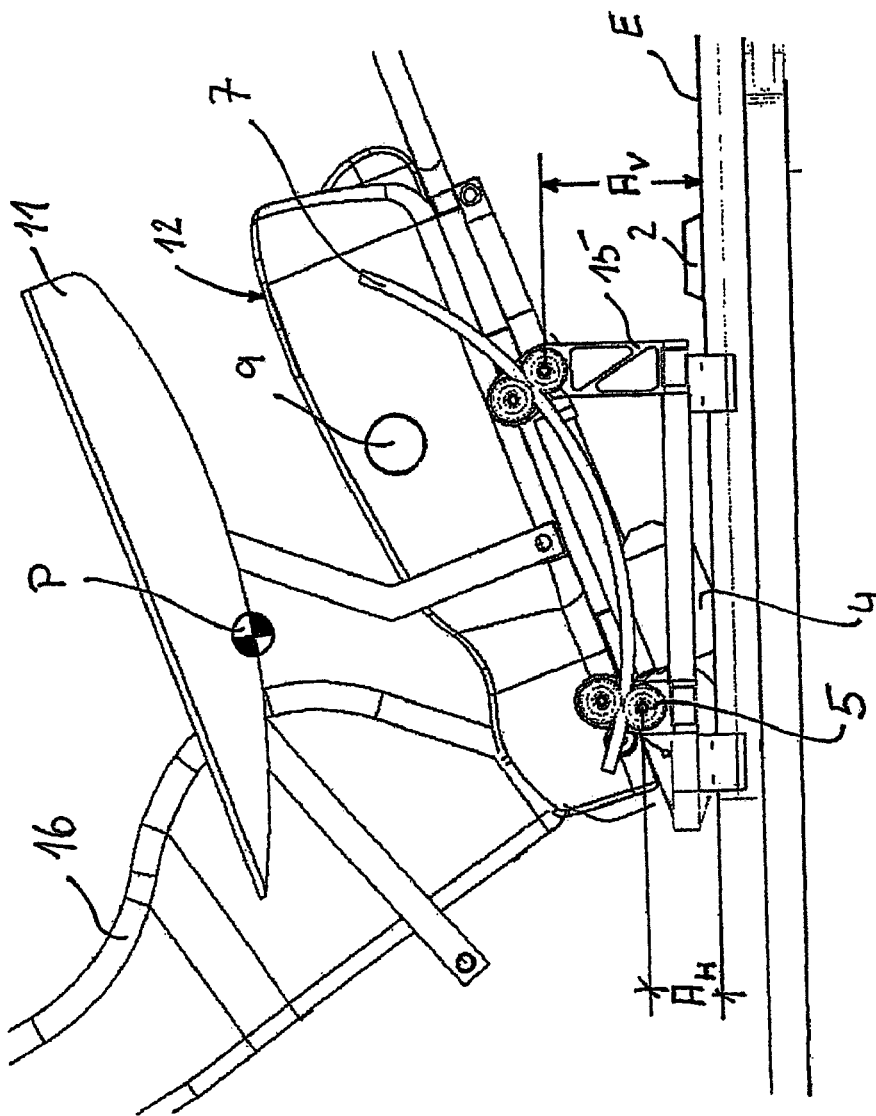
FIG. 2 shows the partial side view of a driver's seat, which is fastened on the chassis, in an inclined position.
Figure 3:
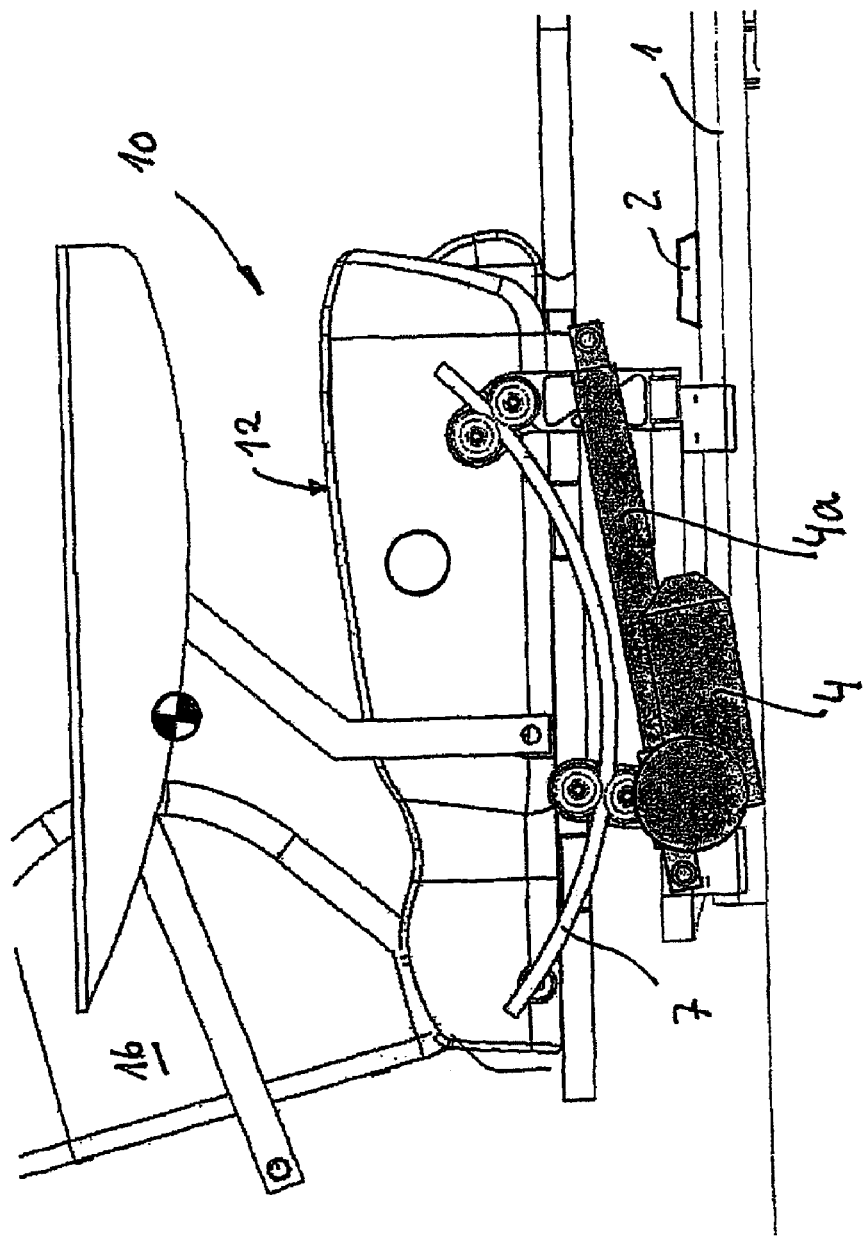
FIG. 3 shows the view according to FIG. 1 with the adjusting device exposed.
Figure 4:
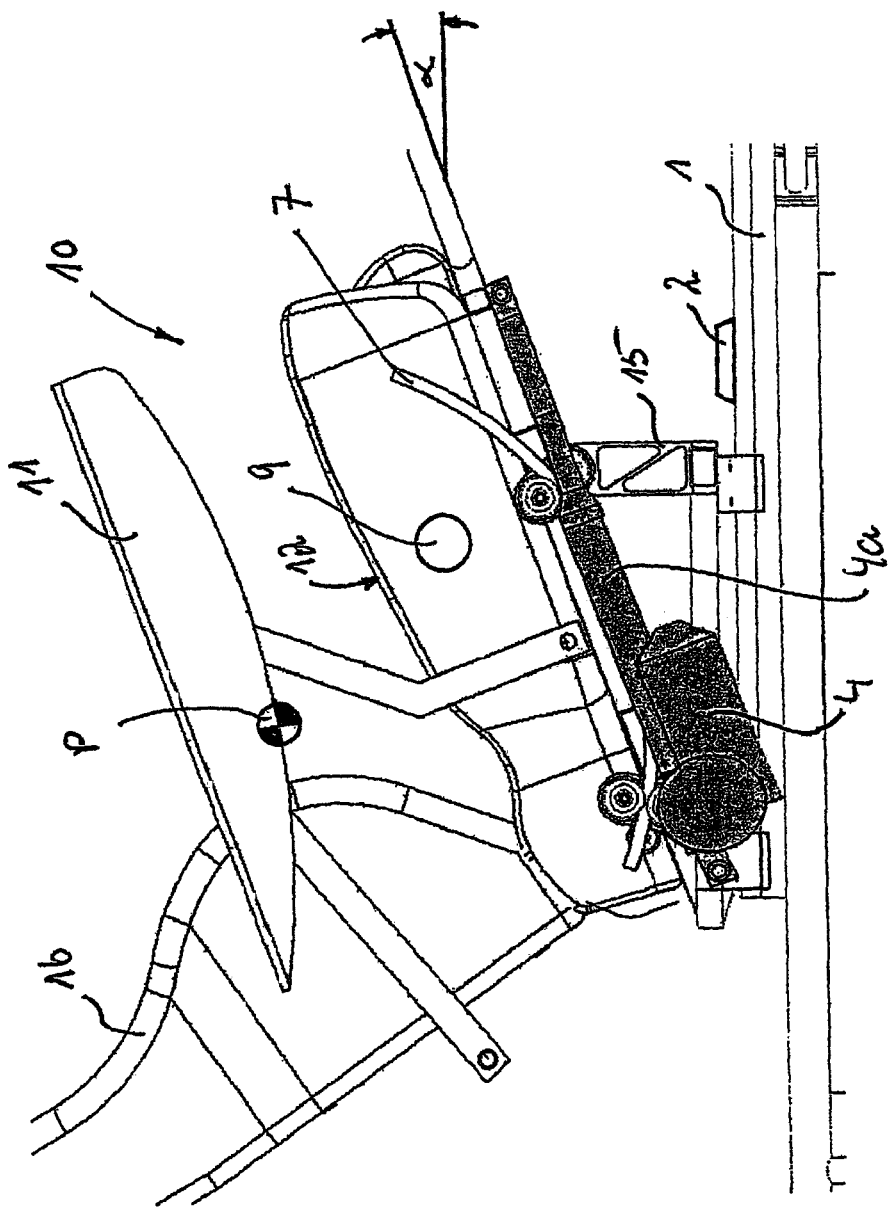
FIG. 4 shows the illustration according to FIG. 2 with the adjusting device exposed.
Figure 5:
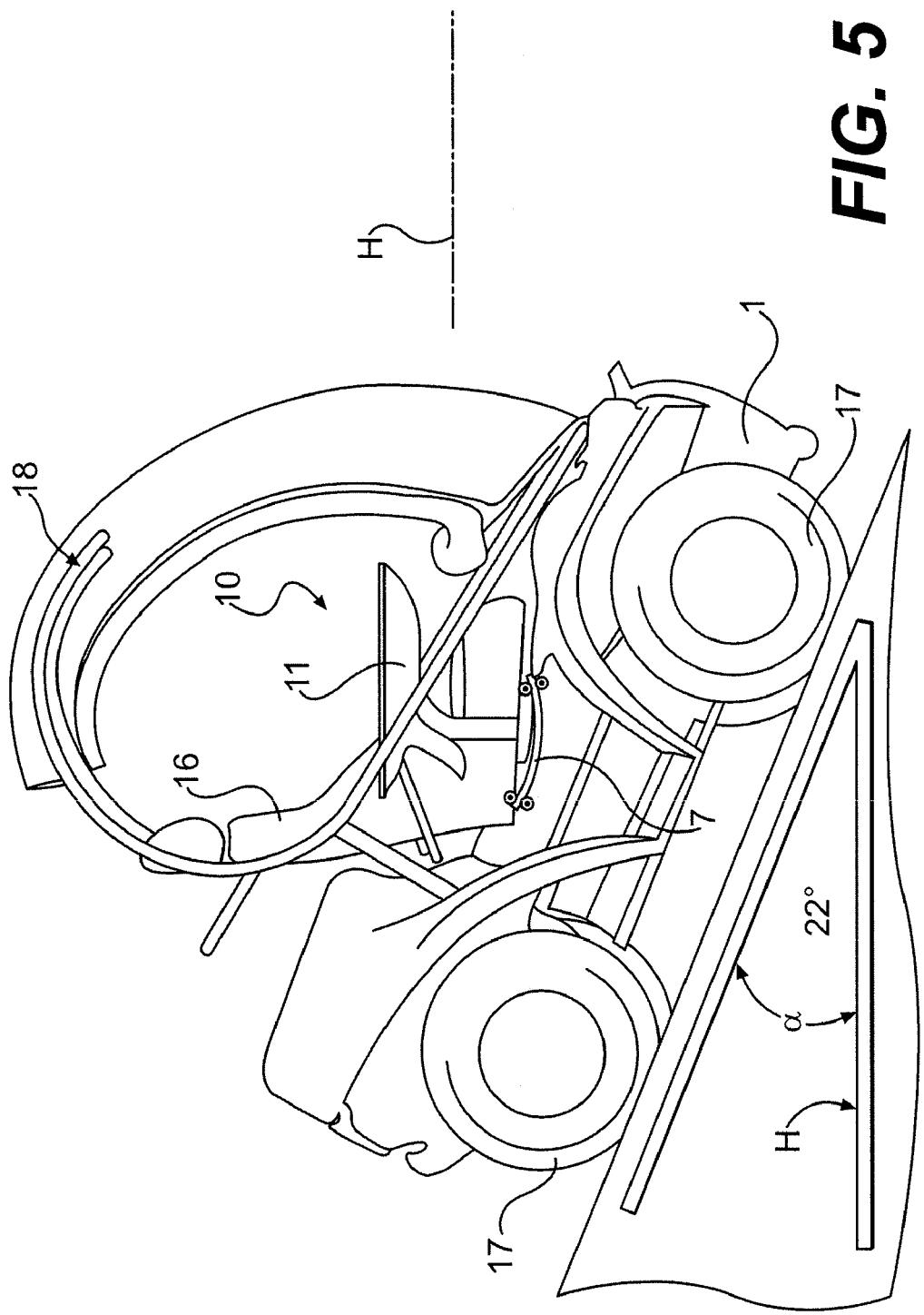
FIG. 5 shows the side view of a vehicle equipped with the adjustable driver's seat.

The vehicle essentially comprises the chassis 1 on which the wheels 17 producing the contact with the road are arranged, and the body 18 which has the driver's seat 10 which can be set in its inclination with respect to the chassis 1.

The driver's seat 10 is provided with a backrest 16 and a seat surface 12 and armrests 11 fastened to securing means 8. The driver's seat 10 is connected to the chassis 1 via front and rear holders 15 and a base plate 3. Fastened on both sides of the driver's seat 10 are curved guide rails 7 which are rounded in cross section and which are guided in four rollers 5, 6; 13, 14 lying opposite one another in pairs. An inclination sensor 9 with which the angular position of the seat surface 12 with respect to a horizontal H is detected is connected to the driver's seat 10. Arranged below the driver's seat 10 is an adjusting device which comprises a linear electric motor 4 with telescopic rod 4a fastened to it, the adjusting device being fastened in an articulated manner by its one end to the chassis 1 or the base plate 3 and by its other end to the driver's seat 10. The inclination sensor 9 and the adjusting device 4, 4a are connected to each other via a control and regulating device 2.

The two holders 15 which are at the front—as viewed in the direction of travel F—are longer than the two rear holders 15, with the result that the distance $A_V$ of the roller 14 from a reference plane E on the chassis 1 is larger than the distance $A_H$ of the rear roller 5.

If the vehicle passes into downhill travel, the inclination sensor 9 detects a deviation of the angular position of the seat surface 12 with respect to the horizontal H and, via the control and regulating device 2, the adjusting motor 4 is activated, the telescopic rod 4a of which then extends and pivots the seat rearward about the angle α, so that the slope—α is correspondingly compensated for and the seat surface 12 remains parallel to the horizontal H. The more precisely the control circuit operates, the more exactly is the parallelism of the seat surface 12 kept with respect to the horizontal H. During the pivoting movement, the driver's seat 10 is guided along the guide rails 7 which have a curved profile and run in the rollers 5, 6; 13, 14. The pivoting movement takes place about a virtual pivoting point P which is selected in such a manner that it is situated in the vicinity of the pivotal point of the mass of the user. For this purpose the entire seat adjustment device can be correspondingly adapted to the driver.

The regulating process takes place continuously, so that the seat surface 12 is always kept in a horizontal plane.

While the invention has been described with reference to exemplary embodiments, it is understood that the words, which have been used herein, are words of description and illustration, rather than words of limitation. Changes may be made, within the purview of the appended claims, without departing from the scope and spirit of the present invention in its aspects. Thus, although the invention has been described herein with reference to particular materials and embodiments, the invention is not intended to be limited to the particulars disclosed herein; rather, the invention extends to all functionally equivalent structures, methods and uses, such as are within the scope of the appended claims.

The invention claimed is:

1. A vehicle having a chassis and a driver's seat which can be set thereon in an inclination with respect to the chassis along two curved rails, comprising:
   an inclination sensor which determines an angular position (α) of a surface of the driver's seat with respect to the horizontal;
   an adjusting device which is connected to the chassis and the driver's seat; and
   a control and regulating device which is operatively connected to the inclination sensor and the adjusting device and via which the driver's seat can be pivoted by the adjusting device in such a manner that the seat surface is situated essentially parallel to the horizontal (H),
   wherein two guide rails are fastened to the driver's seat and are mounted in each case between at least two rollers connected in a positionally fixed manner to the chassis.

2. The vehicle as claimed in claim 1, wherein the at least two rollers are four rollers in each case.

3. The vehicle as claimed in claim 1, is an electric wheelchair.

4. The vehicle as claimed in claim 1, wherein the driver's seat can be pivoted by the adjusting device in such a manner that a seat surface of the driver's seat is always situated essentially parallel to the horizontal (H).

5. The vehicle as claimed in claim 1, wherein the at least two rollers are at a different vertical distance ($A_V A_H$) with respect to a reference plane (E) on the chassis.

6. The vehicle as claimed in claim 5, wherein a distance ($A_V$) of front rollers, as viewed in the direction of travel (F), is larger than a distance ($A_H$) of rear rollers of the at least two rollers.

7. The vehicle as claimed in claim 1, wherein the adjusting device is a telescopic cylinder.

8. The vehicle as claimed in claim 7, wherein the telescopic cylinder is driven by an electric motor.

9. A method for adjusting the driver's seat of the vehicle as claimed in claim 1, wherein the driver's seat is pivoted about a virtual pivot point (P) when the vehicle travels downhill.

10. The method as claimed in claim 9, wherein the pivoting movement by the control and regulating device is regulated in such a manner that the seat surface of the driver's seat is always situated essentially parallel to the horizontal (H) during travel downhill.

11. The method as claimed in claim 9, wherein the virtual pivoting point (P) is situated in the vicinity of the pivotal point of the mass of a driver sitting on the driver's seat.

12. A vehicle, comprising:
   a chassis;
   a front mounting holder and a rear mounting holder, the front mounting holder being at a first height and the rear mounting holder being at a second height, different from the first height;
   a driver's seat mounted to the chassis via the front holder, the rear holder and a base plate;
   curved guide rails fastened to opposing sides of the driver's seat and guided by engaging rollers lying opposite one another in pairs and at different heights;
   an inclination sensor with which an angular position of a seat surface of the driver's seat with respect to a horizontal H is detected;
   an adjusting device which comprises a linear electric motor with telescopic rod is fastened to the driver's seat and one of the base plate and the chassis; and
   a control and regulating device connected to the inclination sensor and the adjusting device.

13. The vehicle as claimed in claim 12, wherein the adjusting device is arranged below the driver's seat.

14. The vehicle as claimed in claim 12, wherein the adjusting device is fastened in an articulated manner by one end to the chassis or the base plate and another end to the driver's seat.

15. The vehicle as claimed in claim 12, wherein the inclination sensor is connected to the driver's seat.

16. The vehicle as claimed in claim 12, wherein the front holder is longer than the rear holder.

17. The vehicle as claimed in claim 12, wherein the guide rails are rounded in cross section and which are guided in four rollers.

18. A vehicle having a chassis and a driver's seat which can be set thereon in an inclination with respect to the chassis along two curved rails, comprising:

an inclination sensor which determines an angular position ($\alpha$) of a surface of the driver's seat with respect to the horizontal (H);

an adjusting device which is connected to the chassis and the driver's seat; and a control and regulating device which is operatively connected to the inclination sensor and the adjusting device and via which the driver's seat can be pivoted by the adjusting device in such a manner that the seat surface is situated essentially parallel to the horizontal (H);

wherein the driver's seat is pivoted about a virtual pivot point (P) when the vehicle travels downhill.

19. The vehicle as claimed in claim 18, wherein two guide rails are fastened to the driver's seat and are mounted in each case between at least two rollers connected in a positionally fixed manner to the chassis.

\* \* \* \* \*